April 14, 1970  A. PARIGOT ET AL  3,506,146
METHOD OF BUILDING STORAGE PILES
Filed Nov. 27, 1967  2 Sheets-Sheet 2

INVENTORS.
ANDRE PARIGOT
CHRISTIAN CARDON
BY
Kurt Kelman
AGENT

United States Patent Office 3,506,146
Patented Apr. 14, 1970

3,506,146
METHOD OF BUILDING STORAGE PILES
André Parigot, Port Marly, Yvelines, and Christian Cardon, Lille, Nord, France, assignors to Societe Fives Lille-Cail, Paris, France
Filed Nov. 27, 1967, Ser. No. 685,825
Claims priority, application France, Dec. 8, 1966, 86,577
Int. Cl. B65g 3/02
U.S. Cl. 214—152                                      1 Claim

ABSTRACT OF THE DISCLOSURE

Mixtures of uniform composition can readily be reclaimed from elongated storage piles built from successively deposited layers of varying composition if each deposited layer is made shorter than the preceding layer at one end of the pile so as to prevent the later-deposited material from sliding downwardly over the preceding layer lengthwise of the pile while making the later-deposited layer longer than the preceding layer at the other end of the pile so that enough of the later material slides lengthwise over the preceding layer to make the ratio of layer thicknesses in the other end portion substantially the same as in the main portion of the pile.

BACKGROUND OF THE INVENTION

This invention relates to the storage of bulk material in storage piles, and particularly to a method of mixing successive batches of the material by depositing the material in superposed layers, and of reclaiming the material from the pile in slices transverse to the layers.

It is common practice to store ore, coal, and similar bulk materials in horizontally elongated storage piles or beds whose main portion is of approximately prismatic shape and whose ends have surfaces obliquely inclined toward the horizontal at the angle of repose of the stored material. When a portion of the material near the bottom at a longitudinal end of the pile is removed, material from the higher strata slides down until a slope corresponding to the angle of repose of the material is restored. The material is thus reclaimed in slices which are inclined relative to the longitudinal axis of the pile at the angle of repose, and material of the several layers is mixed in each reclaimed slice.

Apparatus for laying down the several layers and for reclaiming slices of the pile has been disclosed in patents to Messiter, Nos. 677,677 and 858,008, both dating from the early part of this century.

The employed apparatus may be a conveyor equipped with a tripping device traveling along the length of the conveyor and causing material to be discharged. As the tripping device moves back and forth, successively supplied batches of material are superimposed in layers. If the conveyor travels along the same line during the building of the entire pile, each layer has the approximate cross sectional shape of an inverted V. If the path of the conveyor is also shifted back and forth in a transverse direction, the layers are approximately plate-shaped and horizontal in the main portion of the pile.

Regardless of the configuration of the layers in the known storage piles, the slices reclaimed from the ends by the usual methods do not have the same average composition as the slices reclaimed from the main portion unless secondary mixing operations are used. Therefore, the material taken from the ends of a pile has been used heretofore for building layers of another pile in which it is being mixed with later batches. The dual handling is wasteful of labor, space and equipment.

The instant invention aims at providing a storage pile from which slices of uniform average composition may be reclaimed from one end practically to the other.

SUMMARY OF THE INVENTION

The invention, in one of its aspects resides mainly in an improved method of depositing the several layers of a storage pile of the described type, in which each layer is made shorter at one end of the pile by a distance sufficient to prevent sliding downward movement of a portion of the later deposited layer over the preceding layer in the direction of pile elongation. At the other end of the pile, the amount of material of each layer is made greater than the amount of the preceding layer by a difference sufficient to cause downward sliding movement of a portion of the later-deposited layer over the preceding layer in the direction of pile elongation, and to cause the ratio of the thicknesses of the several layers in the other end portion to be substantially the same as in the main portion.

The invention also resides in the piles themselves as they result from the method outlined above.

Other features, additional objects and many of the attendant advantages of this invention will readily become apparent from the following detailed description of preferred embodiments when considered in connection with the appended drawing.

DESCRIPTION OF THE PRIOR ART

Figure 1:
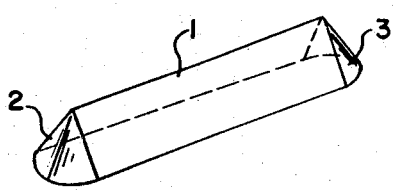
FIG. 1 shows a storage pile of bulk material in a perspective view.

Referring initially to FIG. 1, there is seen a storage pile whose main portion 1 has the shape of a triangular prism, and whose end portions 2, 3 are halves of a cone whose surfaces are inclined at the angle of repose of the piled material.

Figure 2:
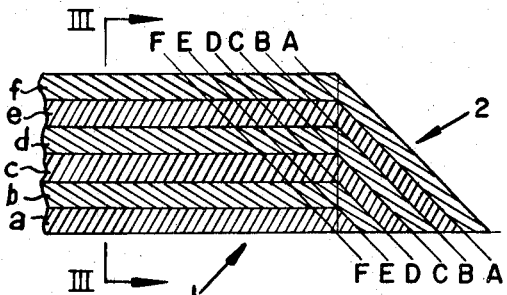
FIG. 2 illustrates the layer structure of a portion of a storage pile of the prior art in elevational section on the longitudinal median plane of the pile.

When viewed in elevational section on the longitudinal median plane, as partly shown in FIG. 2, the pile of FIG. 1, when built by conventional methods, consists of sucessively deposited layers, six layers a to f being shown by way of example. The layers are formed by means of a conveyor and of a tripping device, which travel back and forth above the crest of the pile so that each layer, when viewed in transverse elevational section in FIG. 3, has the shape of an inverted V. In the end portions 2, 3, the first-deposited layer a is shorter than the later deposited layers b to f each of which is longer than the immediately preceding layer.

When the conventional pile is sliced obliquely to the direction of elongation along successive planes A—A to F—F during reclamation, the first slice consists entirely of material of the layer f. The second slice consists mainly of material from the layer e. Only the sixth slice cut along the line F—F consists of material having an average composition identical with that of later slices taken from the main portion 1 of the pile. As is not shown in the drawing but obvious from inspection of FIG. 1, the slices taken from the other end portion 3 (not seen in FIG. 1) are similarly defective and not representative of the average composition of the entire material in the pile.

DESCRIPTION OF THE PREFERRED EMBODIMENTS

Figure 3:
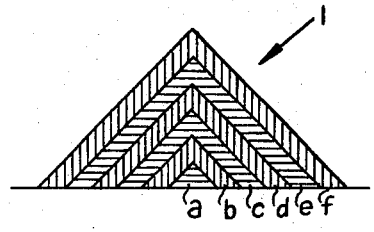
FIG. 3 shows the pile of FIG. 2 in section on the line III—III.
Figure 4:
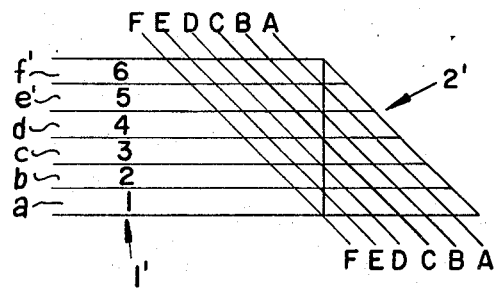
FIG. 4 shows one end portion and a part of the main portion of a storage pile of the invention in a view corresponding to that of FIG. 2.

A pile of the invention, when deposited by an apparatus corresponding to that described with reference to FIGS. 1 to 3 is similar in overall appearance to the pile shown in FIG. 1. As seen in FIG. 4, it consists of six layers $a'$ to $f'$. In the end portion 2', the layer $a'$ is longest, the layer $f'$ is shortest, and the longitudinal terminal faces of the several layers are offset longitudinally of the pile along a line which is inclined relative to the horizontal base of the pile at the angle of repose of the pile material.

Because of the difference in the length of the layers $a'$ to $f'$ in the end portion 2', downward sliding movement of a portion of each layer over the preceding layer lengthwise of the pile is prevented. When reclamation of the pile begins at the end portion 2' shown in FIG. 4, the first slice cut along line A—A has practically the same average composition as the later slices cut along the lines B—B to F—F, and as the slices cut from the main portion 1' of the pile. It will be understood that the configuration of the layers in cross section on the main portion 1' is the same as shown in FIG. 3.

While the configuration of individual layers in the end portion 2 of a conventional pile (FIG. 2) is brought about by reversing the direction of movement of the tripping device in the same vertical line in each run, the configuration illustrated in FIG. 4 is achieved by making each run of the tripping device toward the end portion 2' shorter than the preceding run. The end portion 2', therefore, is not one-half of a cone, but consists of halves of approximate conical frusta superimposed in such a manner that their longitudinal end faces are offset at the angle of repose of the material in the elevational median longitudinal plane of the pile.

The somewhat terraced shape of the pile which would result from an instantaneous reversal of the tripping device at the end 2' of the storage pile can be smoothed by arresting the tripping device in its terminal position for dwell periods which become longer as the height of the pile increases. If the rate of discharge from the conveyor is uniform, and the dwell periods increase proportionally with the height of the pile, it is possible to obtain a shape substantially identical with that of the conical end portion 2 shown in FIG. 1.

Figure 5:
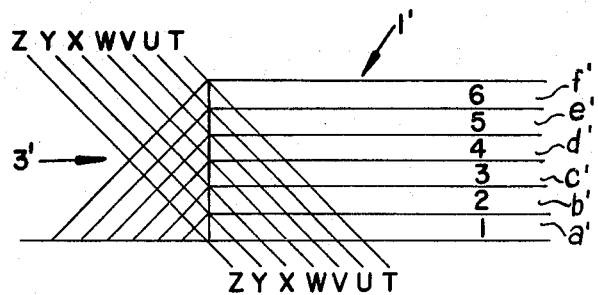
FIG. 5 illustrates the other end portion of the pile of FIG. 2 in a corresponding view.

FIG. 5 shows the configuration of the layers $a'$ to $f'$ in the end portion 3' of the storage pile partly illustrated in FIG. 4. It is achieved by reversing the direction of movement of the tripping device of the conveyor in the same vertical line during the several runs, but holding the tripping device at the point of reversal for dwell periods which increase proportionally to the height of the pile. The end portion 3', therefore, has the shape of one-half of a cone in which the thickness ratio of the several layers is the same as in the main portion 1'.

The slices of stored material reclaimed in sequence by removing the material along the lines T—T to Z—Z are uniform in average composition, but the very small amount of residual material beyond the cut Z—Z should not be further sliced. It is only about one-quarter of the material taken from the end portion between the cuts T—T to Z—Z.

The small residue of the pile may be employed, if so desired, at the end portion of another pile that will be built on the same location from later batches. The dwell periods of the tripping device of the conveyor above the end portion must be shortened to take the material initially available into account.

Figure 6:
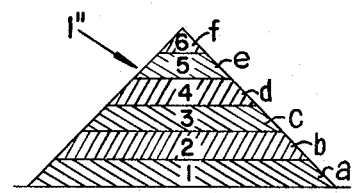
FIG. 6 shows the main portion of another storage pile of the invention in a view as in FIG. 3.

FIG. 6 shows the main portion 1" of a storage pile of the invention which is laid down by a conveyor reciprocated transversely during the longitudinal back-and-forth movement of the tripping device, the stroke of transverse movement decreasing with increasing height of the pile. The layers $a''$ to $f''$ produced in this manner are approximately plate-shaped, as is evident from the transverse elevational section of FIG. 6. When viewed in elevational section on its longitudinal median plane, the pile of FIG. 6 would appear as in FIG. 2, the lowermost layer $a''$ projecting longitudinally beyond the subsequent layers of which again the layer $b''$ is longer than the layers $c''$ to $f''$. The surface of the end portion 2" is given the shape of one half of a cone by not only shortening the path of the tripping device toward the end portion 2", as the height of the pile increases, but by also varying the length of the path as the conveyor moves from side to side of the pile, the path being longest in the median longitudinal plane of the pile.

Figure 7:
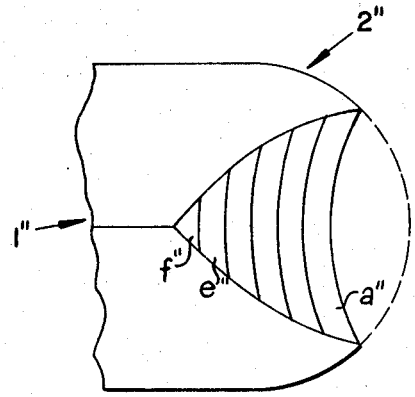
FIG. 7 shows one end portion of the pile of FIG. 6 after partial reclamation in plan view.

FIG. 7 shows one end of the pile of FIG. 6, and the configuration of the layers is seen as it appears during reclamation by means of a power shovel whose bucket is supported on a swinging arm attached to a normally stationary tracked vehicle. The conical outline of the removed part of the end portion 2" is indicated by broken line. As is evident from joint inspection of FIGS. 2 and 6, all slices taken from the end portion 2" are practically uniform in their average composition.

Figure 8:
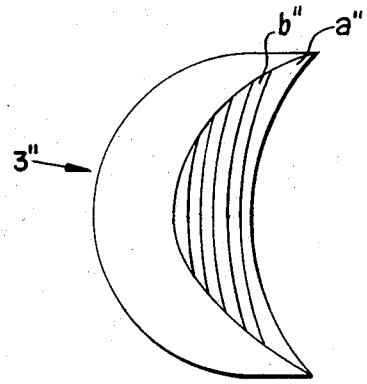
FIG. 8 shows the other end portion of the pile of FIG. 6 after almost complete reclamation, in plan view.

The other end portion 3" of the storage pile illustrated in FIGS. 6 and 7 is shown in FIG. 8 in the terminal stage of the reclaiming operation by the power shovel referred to with reference to FIG. 7. The end portion 3", when viewed in elevational section on its longitudinal median plane, would appear as shown in FIG. 5, and FIG. 8 shows the condition after a slice was taken on the line Z—Z. No further material of uniform average composition can be taken from the end portion 3".

Figure 9:
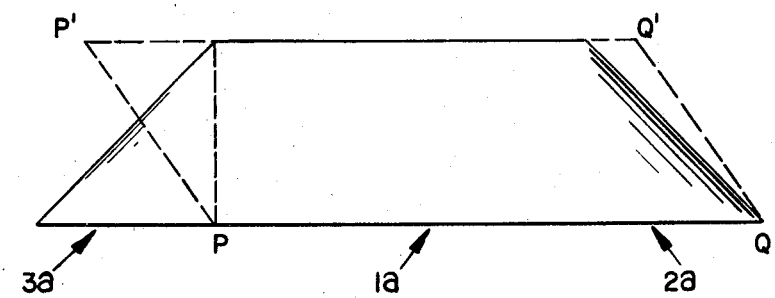
FIG. 9 illustrates a modified method of building a storage pile of the invention, the view being in side elevation and partly diagrammatic.

Instead of arresting the tripping device of the conveyor which supplies the material for the storage pile, one may also extend the stroke of the device while making its reversal instantaneous, as is illustrated in FIG. 9.

The illustrated storage pile has a main portion $1a$ and longitudinal end portions $2a$, $3a$. Its several layers may be of inverted V-shape when viewed in cross section transversely of the direction of elongation. The tripping device of the associated conveyor, not itself shown, travels initially between a point P vertically aligned with the future longitudinal end of the crest on the pile to be produced and a point Q at the longitudinally terminal part of the first or bottom layer of material in the end portion $2a$. In subsequent runs, the points of reversal of the tripping device are shifted in a direction from the end portion $2a$ toward the end portion $3a$ so that the tripping device ultimately lays down a top layer of material while moving between the points P' and Q', intermediate points of reversal being located on the straight, parallel lines P-P' and Q-Q', and the path of the tripping device having practically the same length during the entire operation.

For the convenience of comparison, the layers in the several illustrated piles have been shown to be of equal thickness and, therefore, of very different weight or bulk. It will be appreciated that the illustrated thicknesses are neither illustrative of normal practice nor in themselves relevant to this invention. The cross-sectional shape of the pile also is without direct influence on the practice of the invention, and a triangular prismatic shape is merely typical of piles whose layers are of inverted V-shape in cross section. Piles whose layers are plate-shaped are trapezoidal in cross section at least during the initial period of their growth, and may not be built to the triangular section seen in FIG. 6 without affecting the benefits to be derived from this invention.

It should be understood, therefore, that the foregoing relates only to preferred embodiments of the invention, and that it is intended to cover all changes and modifications of the example of the invention herein chosen for the purpose of the disclosure which do not depart from the spirit and scope of the invention set forth in the appended claim.

What is claimed is:

1. In a method of forming a laminated storage pile of particulate material wherein a plurality of different material layers are successively deposited and superposed in a pile which has a horizontally elongated main body portion with a front end portion where reclamation of material from the pile is started and a rear end portion where reclamation of the material is ended and wherein the front end portion has an exposed front face slanted upwardly and rearwardly by an angle of repose of the material and wherein the rear end portion has an exposed rear face slanted downwardly and rearwardly by an angle of repose substantially corresponding to that of the exposed front face; an improvement in depositing the material layers comprising the steps of: (a) depositing the material layers in the main body portion as well as in the front end portion of the pile so that they extend horizontally in the longitudinal direction through the front end portion and each layer has an exposed front edge constituting a component of the exposed front face of the front end portion, so that when reclamation of material in planes substantially parallel to said angle of repose of the front face is started at the front face and continued through the main body portion of the pile, material is reclaimed simultaneously from all the material layers, and (b) depositing the material layers in the rear end portion of the pile at a rearwardly downward slant substantially parallel to the angle of repose of the rear face, so that reclamation of material may be ended in the rear end portion simultaneously from all the material layers.

References Cited

UNITED STATES PATENTS

| 662,063 | 11/1900 | Edison | 259—180 |
| 3,233,877 | 2/1966 | Kelly | 214—10 XR |

OTHER REFERENCES

How to Use Conveyors for Proportioning, Mixing and Blending, reprinted from Modern Materials Handling, January 1954, Figs. 3 and 6 of reprint.

Bulletin #116, University of Illinois Experiment Station, January 1920, p. 140, Fig. 74.

GERALD M. FORLENZA, Primary Examiner

F. E. WERNER, Assistant Examiner

U.S. Cl. X.R.

214—10